June 14, 1966　　　C. M. RICE　　　3,256,134
YARN TREATING PROCESS AND PRODUCT
Filed Oct. 9, 1963　　　10 Sheets-Sheet 1
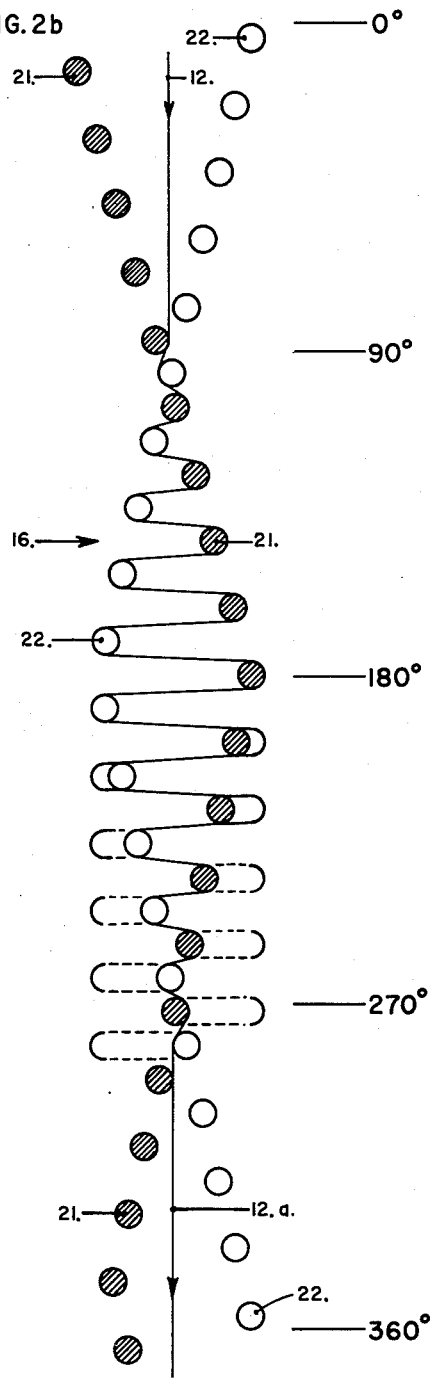
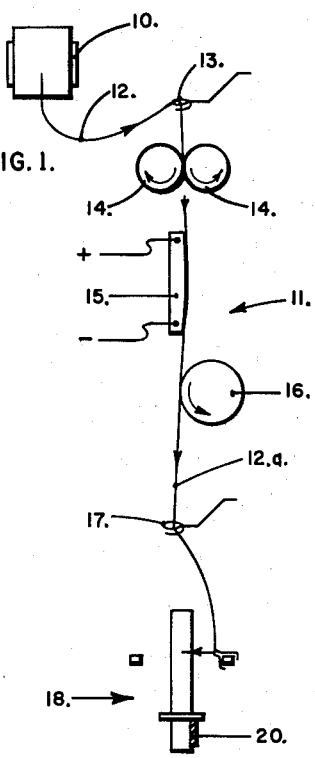
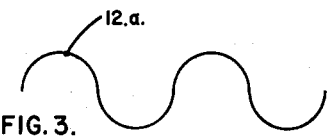
FIG. 3.
INVENTOR.
CHARLES M. RICE
BY Francis W. Young
ATTORNEY June 14, 1966  C. M. RICE  3,256,134
YARN TREATING PROCESS AND PRODUCT
Filed Oct. 9, 1963  10 Sheets-Sheet 2

INVENTOR.
CHARLES M. RICE
BY
ATTORNEY

June 14, 1966   C. M. RICE   3,256,134
YARN TREATING PROCESS AND PRODUCT
Filed Oct. 9, 1963   10 Sheets-Sheet 3

INVENTOR.
CHARLES M. RICE
BY
*Francis W. Young*
ATTORNEY

INVENTOR
CHARLES M. RICE
BY Albin F. Knight

ATTORNEY

INVENTOR.
CHARLES M. RICE
BY Allin F. Knight

ATTORNEY

June 14, 1966 C. M. RICE 3,256,134
YARN TREATING PROCESS AND PRODUCT
Filed Oct. 9, 1963 10 Sheets-Sheet 9

INVENTOR.
CHARLES M. RICE
BY Allan F. Knight

ATTORNEY

June 14, 1966  C. M. RICE  3,256,134
YARN TREATING PROCESS AND PRODUCT
Filed Oct. 9, 1963   10 Sheets-Sheet 10
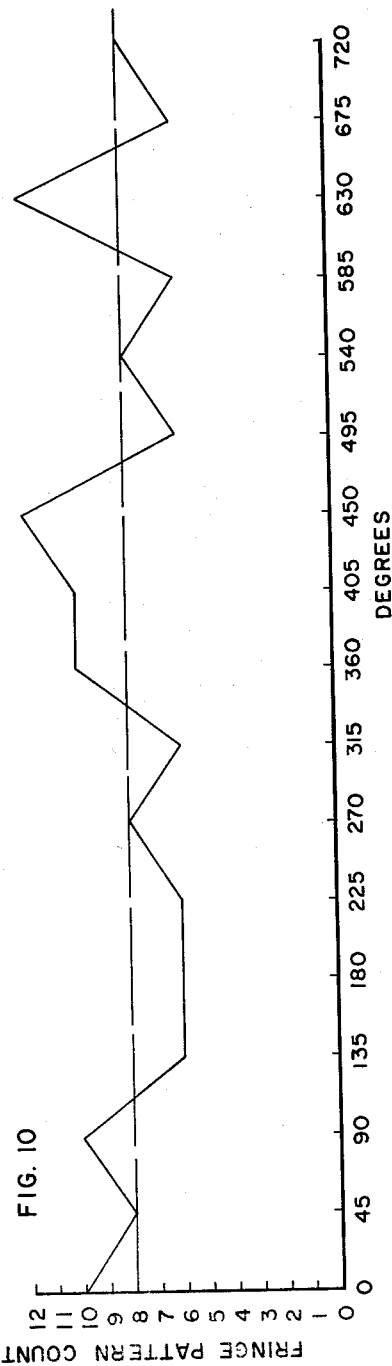
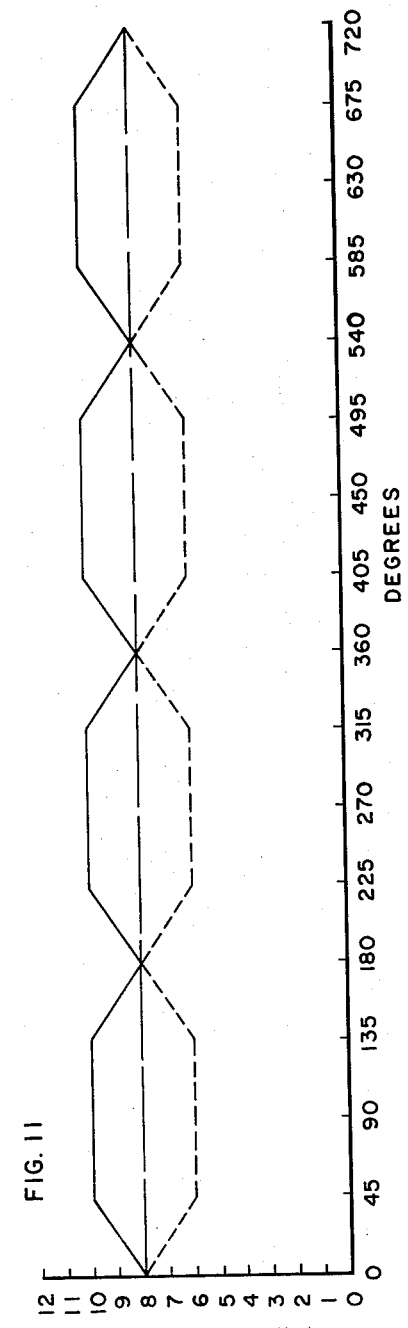
INVENTOR.
CHARLES M. RICE
ATTORNEY

3,256,134
YARN TREATING PROCESS AND PRODUCT
Charles M. Rice, Candler, N.C., assignor to American Enka Corporation, Enka, N.C., a corporation of Delaware
Filed Oct. 9, 1963, Ser. No. 315,079
9 Claims.  (Cl. 161—172)

This application is a continuation-in-part of application Serial No. 281,724 filed May 20, 1963. However, when the process of that application is followed precisely, the characteristics of the product are inherent in the process and will be hereinafter described in detail.

The present invention is directed primarily to a novel product which has high residual shrinkage and latent permanent crimp. This product is a yarn or filament of thermoplastic synthetic linear high polymer such as polycaproamide (nylon 6) for use in tricot, hosiery, weaving, and other types of fabrics.

Early in 1955, patentee F. R. Page disclosed in U.S. Patent No. 2,601,451 a system for producing crimped thermoplastic yarn which, when knit into hosiery, tricot or fabric, would exhibit an irregular stitch formation, avoid the appearance of streaks or shadows, reduce light reflection and consequent sheen, obscure minor defects in stitch, and generally provide a crepe-like fine grain appearance, a softness of stretch, and an improved conformity to shape of the wearer. In order to achieve these desirable properties, patentee proposed the knitting of fine denier thermoplastic (nylon) yarn into fabric, heat setting the fabric to about 225° F., and unraveling, after which the crinkled or crimped yarn could be reknit into the desired product. This process, which has now become known as "knit-setting," is obviously time-consuming and therefore expensive. At the time of the Page invention, no other system was known.

Since the advent of "knit-setting" evidenced by the Page patent, many attempts have been made to produce this yarn on a more continuous and therefore less time-consuming and more economical basis. For an example of such attempts, see U.S. Patents: No. 2,636,250 to Sandoz, Ltd.; No. 2,668,564 to R. K. Laros Silk Company; No. 2,696,034 to Wildman and Swartz, Inc.; No. 2,751,661 to Alexander Smith, Inc.; No. 2,812,569 to Scott and Williams, Inc., and No. 2,974,392 to The Chemstrand Corporation.

In an effort to simulate "knit-set" yarn, each of the foregoing methods, with variations in procedure, displaces drawn thermoplastic yarn into the desired zig-zag or crimped condition and then heats the yarn so crimped to preserve the temporary configuration thereof. While these systems represent a considerable advance over the more conventional knit/heat-set/ravel procedure, it was found that production could not be increased the desired and expected amount because of difficulties encountered in providing sufficient heating and cooling of yarn traveling at the desired high speeds while in contact with complicated machine elements. Moreover, due to space requirements, it is difficult to modify conventional yarn processing equipment, such as drawtwisters or drawwinders, to accommodate this type of yarn crimping machinery. Additionally, because of the high speeds desired, it has been found that the crimp is not exposed to heat for a sufficient length of time to insure permanence, and that the crimped yarn therefore must be handled carefully and under very low tensions after passage through the crimping equipment.

Conventional methods of producing crimped yarn generally result in a product which has a very markedly reduced shrinkage. These methods involve the steps of deforming the yarn from its normally straight shape into a zig-zag spiral or wavy path and applying heat to the yarn while it is in this form. Since the yarn is in a relaxed condition, there is nothing to prevent the yarn from shrinking to its fullest extent. Even though the yarn may be subsequently straightened under tension for purposes of packaging or other textile operations, it will never regain its normal shrinkage. For example, normally drawn nylon 6 has a shrinkage of greater than 8% and usually between 13 and 15%, whereas similar yarn which has been given a heat treatment while relaxed will have a shrinkage value between 0% and 6%. Yarns that have been subjected to a knit-set treatment or crimped in a stuffer box are heated in a substantially tension-free condition to set the crimp in the yarn at which point a very low shrinkage results.

The term "shrinkage" (or "residual shrinkage") as used throughout the specification and claims is intended to mean the actual shortening of the yarn along its axial length, which phenomena is the result of exposure to heat in a relaxed condition such as by immersion in boiling water or steam.

The term "contraction" as used throughout the specification and claims is intended to mean the shortening of the distance between the ends of a yarn or between two points on the yarn as a result of crimp. Such crimping is a distortion of the yarn from a straight line upon the application of heat or after the yarn has been relaxed for a period of time.

One of the purposes of producing a crimped yarn is to provide novelty effects in combinations with normal yarns. For example, the aforementioned knit-set yarn, when combined with normal yarn in a tricot fabric, produces a pleasing appearance and hand by virtue of the distortion of the stitch formation. This distortion of the stitch is accomplished by the tendency of the knit-set yarn to return to the shape it was given in the knit-setting.

The yarn of the present invention will also produce a novelty fabric similar to that described above, since the latent crimp which will be developed upon heat treatment in the fabric will distort the companion yarn. In addition, however, the high degree of shrinkage in the crimped yarn will assist in drawing the companion yarn out of its normal stitch pattern. Knit-set yarn cannot accomplish this effectively since its shrinkage after processing is very low, namely, from 1 to 2%. The yarn of the present invention, having both latent crimp which is developed upon heating, as well as a high shrinkage, produces a novel and desirable result in tricot fabric both by the convolutions of the yarn itself and also by the distortion of the companion yarn from the normal stitch pattern. The second effect improves as the shrinkage value increases.

It is well known that drawn yarn, when viewed in a light which has been cross polarized, exhibits light and dark fringes which indicates areas of varying strain in the yarn which is identified as a fringe pattern. For example, see Textile Research Journal, September 1962, page 785.

Therefore, a principal object of this invention is to produce a permanently crimped or crinkled synthetic linear high polymer yarn that may be collected in package form whereby the crimp is temporarily removed but is latent and will be restored upon subsequent processing with heat with or without a liquid treatment. Also, crimp can be restored by allowing fabric or yarn to relax for a number of hours in normal humidity and temperature.

Another object of the present invention is the production of a synthetic linear high polymer yarn that has a latent crimp and a high degree of residual shrinkage.

A further object of the present invention is the production of a synthetic linear high polymer yarn having uniformly interrupted fringe patterns which correspond in regularity to the yarn crimp.

A still further object of this invention is the production of a crimp-drawn synthetic linear high polymer yarn which has a high residual shrinkage plus a high degree of contraction, both the shrinkage and contraction being effected and fully developed by the application of heat.

Another object of the present invention is to provide a process for treating synthetic linear high polymeric yarn to produce a latent permanent crimp therein.

Still another object of this invention is to provide a process for permanently crimping synthetic linear high polymer yarn without the addition of a setting agent at the point where crimping action occurs.

A further object of the present invention is to provide a process for permanently crimping synthetic linear high polymeric yarn which is readily adaptable to existing yarn treating systems and thereby avoids the addition of separate operating steps.

A further object of this invention is the provision of a yarn treating process which, insofar as known, functions at relatively high or low operating speeds, although the quality of the product improves as the speed increases, and which is not limited in crimp performance to prolonged exposure or dwell time between the yarn and a source of heat at the crimping point.

A more specific object of the present invention is to provide a process for physically deforming or drawing a traveling orientable polycaproamide yarn into a crimped condition to produce a permanent modification in the internal structure and external appearance thereof.

A limited object of this invention is to provide a process for forming crimped yarn by physically gripping successive portions thereof and by pulling alternately gripped portions laterally in opposite directions.

These and other objects will become apparent from the following detailed disclosure when considered in conjunction with the accompanying drawings, wherein:

FIGURE 1 illustrates in elevation a schematic view of an apparatus which may be used to practice the disclosed process and produce crimped yarn;

FIGURE 2b shows in detail treatment of orientable yarn during passage through a portion of the equipment shown schematically in FIGURE 1;

FIGURE 3 illustrates a crimped yarn product obtained with the equipment of FIGURES 1, 2, 2a and 2b;

The photomicrographs of FIGURES 4–9 illustrate the appearance of the yarn when viewed between crossed polarizers.

Figure 4:
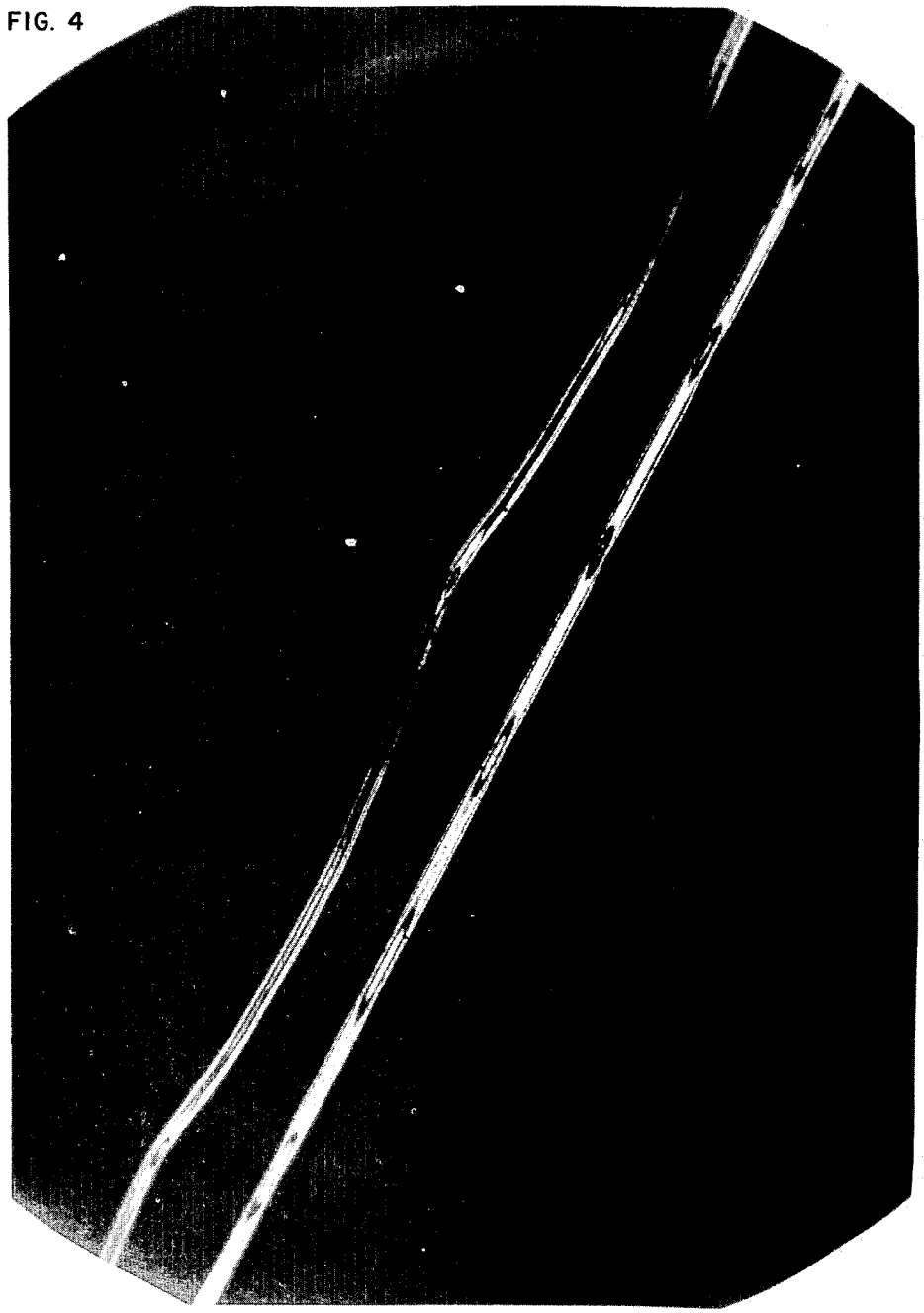
Figure 5:
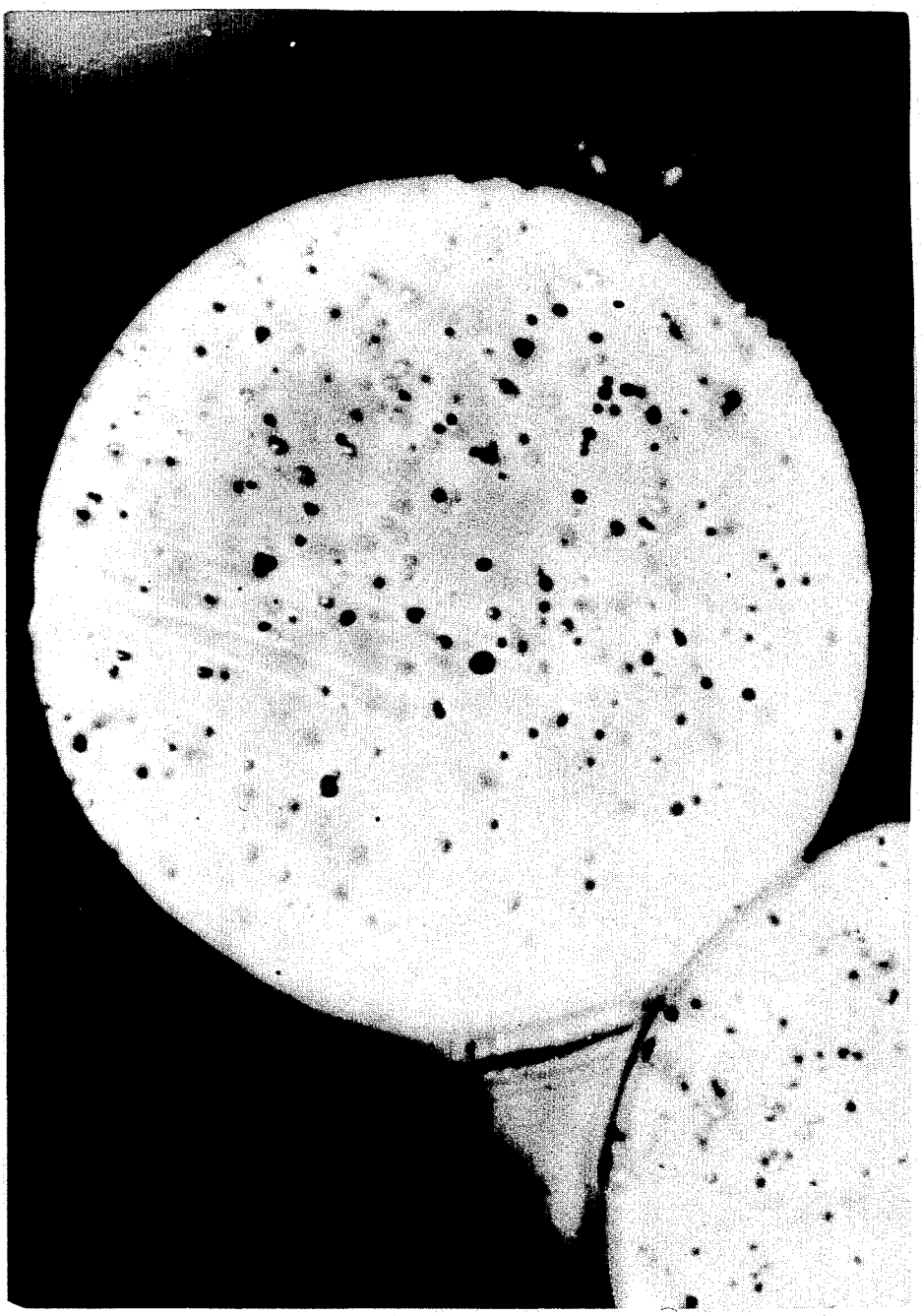
Figure 6:
Figure 7:
Figure 8:
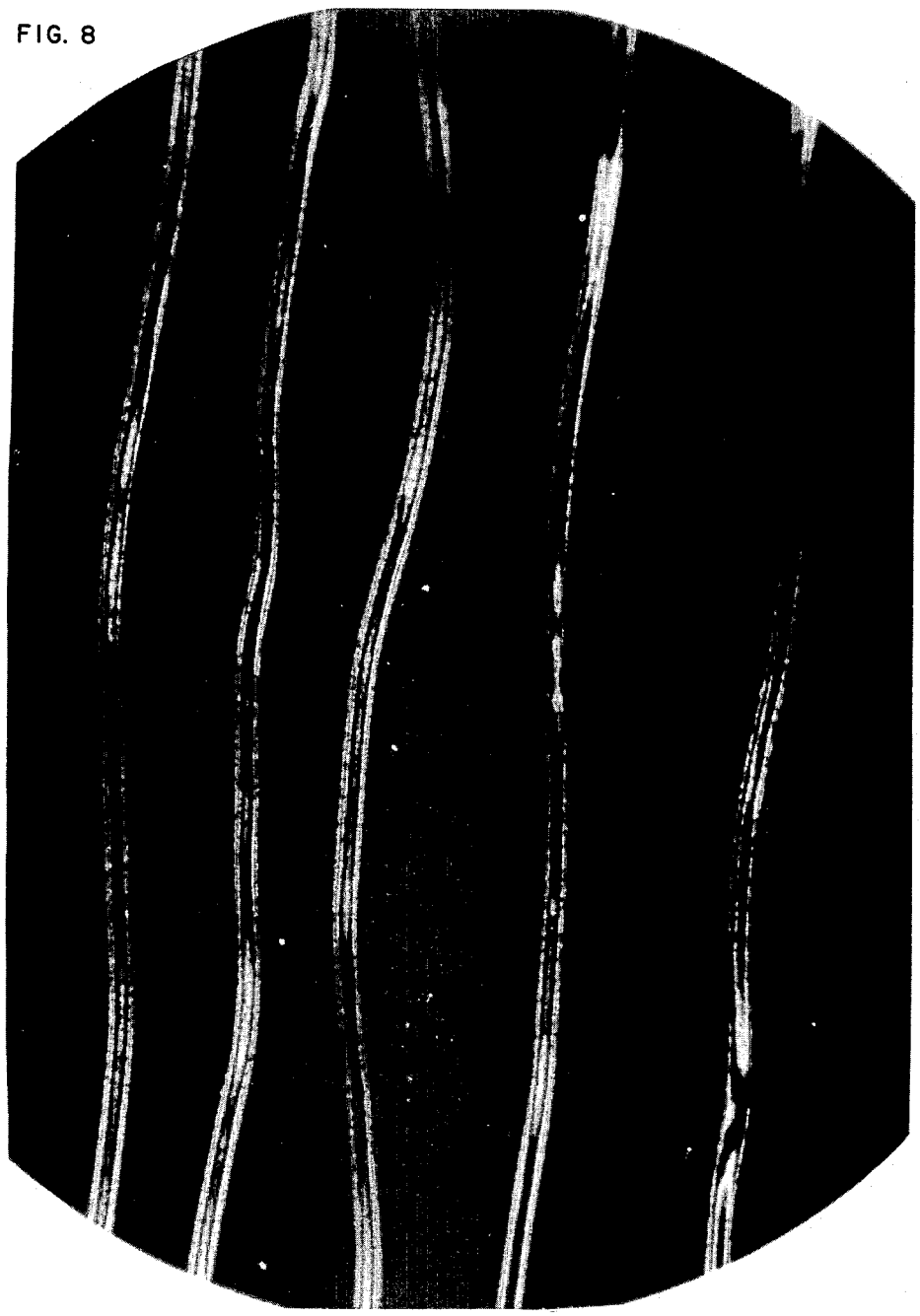
Figure 9:
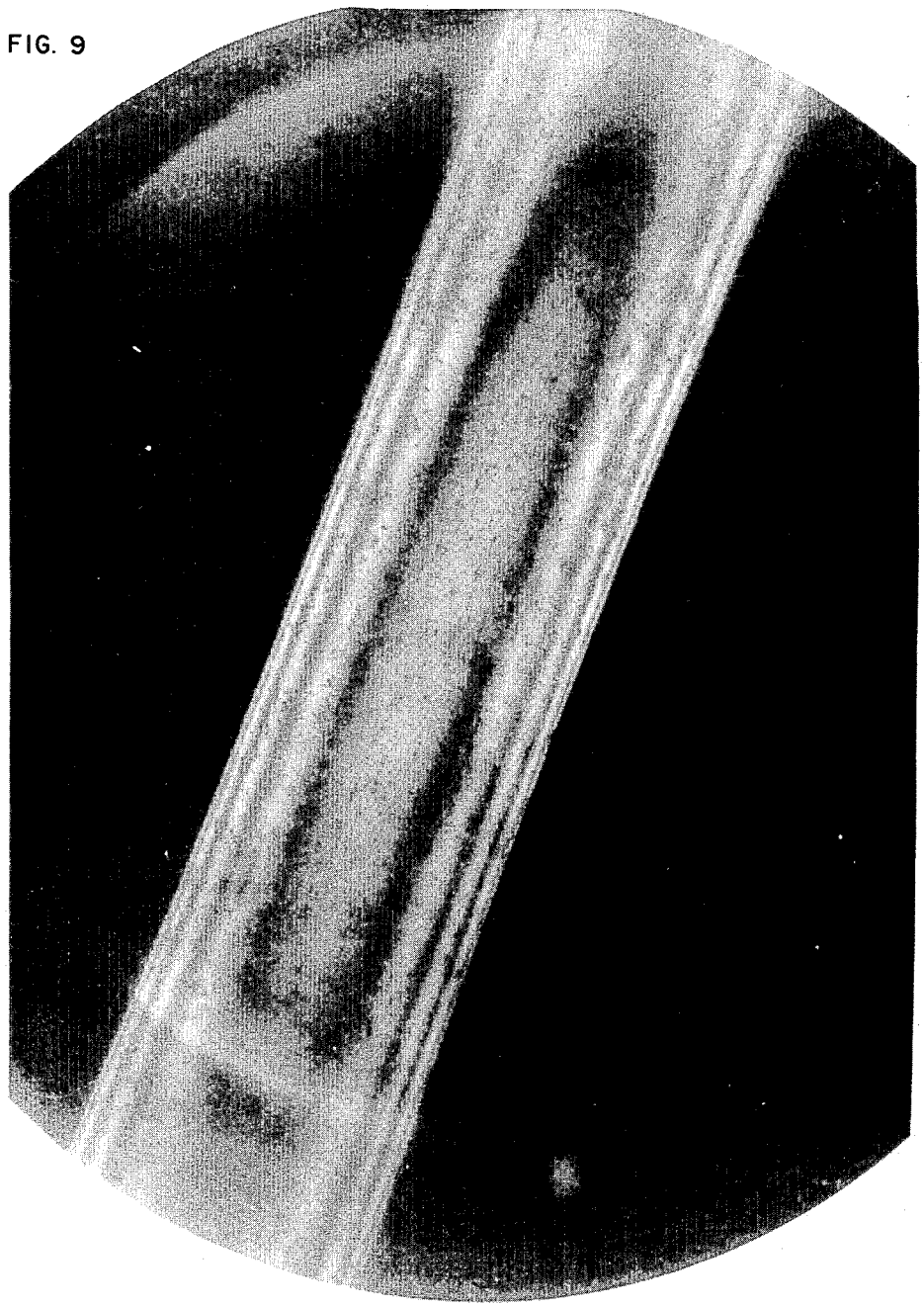

FIGURE 4 is a photomicrograph at a magnification of 56 comparing the internal structure of conventional "knit-set" yarn on the left with crimped yarn on the right;

FIGURE 5 is a photomicrograph at a magnification of 2625 showing the cross section of crinkled yarn taken along the lines 5—5 of FIGURE 3;

FIGURE 6 is a photomicrograph also at a magnification of 2625 showing the cross section of crinkled yarn taken along the line 6—6 of FIGURE 3;

FIGURE 7 is a photomicrograph at a magnification of 84 showing the fringe pattern of crinkled yarn when viewed from various planes rotated approximately 90° one with respect to the other;

FIGURE 8 is a photomicrograph also at a magnification of 84 showing the internal structure of conventional knit-set yarn when viewed from various planes also rotated 90° one with respect to the other;

FIGURE 9 is a photomicrograph at a magnification of 1062 showing more clearly a typical fringe pattern;

FIGURE 10 is a graph illustrating in solid line the fringe pattern count of conventional knit-set yarn through two cycles of curvature and comparing the same with the fringe pattern count (in dashed line) of a conventionally fully drawn, but otherwise untreated, yarn of comparable denier; and FIGURE 11 is a graph illustrating in solid line the fringe pattern count of crimped yarn of this invention through two cycles of curvature similar to that shown in FIGURE 10 and also comparing this fringe pattern count with that of fully drawn, but otherwise untreated, yarn of comparable denier and illustrating further in dotted lines the same crimped yarn when viewed at an angle rotated 90° with respect to the first viewing.

In accordance with the process of this invention, undrawn or incompletely drawn yarn, such as that formed from synthetic linear high polymer solutions, is unwound from a package and placed in a treating or crimping zone where it engages and is wrapped around interdigitating teeth or rods of a known type pin wheel, is gripped along successive portions thereof by adjacent teeth, and thereafter is drawn or physically deformed laterally into the desired crimped shape. Since the yarn is elongated laterally into a crimped condition and is simultaneously oriented and drawn, the deformed shape is persistent and tends to remain in the yarn even though no external source of heat or other setting agent was used. Furthermore, the heat developed in the yarn per se, as a result of the drawing operation, enhances the permanency of the crimp; and, in addition, the cooling or chilling as the crimped yarn passes the latter elements of the pin wheel tends to set the crimp. It has been found, however, that the use of heat immediately prior to the point where the yarn enters the crimping wheel not only facilitates the operation of partial drawing, but also improves the effectiveness and permanence of the subsequent crimp drawing. In any case, the yarn after crimping can be placed immediately under sufficient tension to remove all of the apparent crimp. The crimp produced is latent, however, and may be restored and developed by relaxation of tension and/or by the application of heat.

With attention now directed to the drawings, and particularly to FIGURE 4, it is clearly shown that the fringe pattern of the yarn of this invention is very uniform, whereas by comparison, the fringe pattern of knit-set yarn is very erratic with no uniform pattern.

FIGURES 5 and 6 shows the cross section shape of the yarn, one being taken in the middle of the bend and the other being taken between the bends, showing that in the bends the cross section has a flat side.

FIGURES 7 and 8 again show the contrast of the fringe patterns between the knit-set type yarn and the yarn of this invention, the latter being uniform when viewed from various planes rotated at 90° and the former being erratic when viewed from the same planes. The fringe patterns occurring in crimped yarn are uniform and are in direct relation to the crimp configuration.

FIGURE 9 illustrates more clearly the actual fringe patterns (see the darkened lines) appearing in the yarn of the present invention.

FIGURE 10 is a graph prepared from a study of the fringe patterns of both conventional knit-set yarn and normal drawn yarn. It will be seen in FIGURE 10 that there occur, at least in the samples measured, eight fringe patterns or lines of orientation throughout the length of conventional normal drawn yarn, as shown by the dashed line. Yarn which has been knit, heat set, and raveled also contains these lines of orientation but in an irregular pattern, as shown by the solid lines of this figure. At the beginning of a crimp cycle (compare FIGURE 10 with FIGURE 3), the measured samples of knit-set yarn exhibited ten distinct lines, as shown at the 0° point on this graph. At 45° along the first cycle of curvature, the fringe pattern count drops to eight and is increased to ten at the 90° point. This variation in fringe pattern count of knit-set yarn is neither uniform with regard to crimp formation nor predictable, as will appear from casual observation of the two complete crimp cycles represented in FIGURE 10.

FIGURE 11 is a graph prepared from a study of the fringe patterns of yarn of the present invention compared with that of normal drawn yarn. Crimped yarn of this invention has been found to exhibit a uniformly predictable variation in fringe pattern count which is definitely associated with crimp formation. For example, and with attention directed to the graph in FIGURE 11, crimped yarn of the samples measured contains or exhibits eight distinct lines of orientation at the 0°, 180°, 360°, 540°, etc., portions of curvature represented in FIGURE 3. At a portion of the curvature displaced 45° on either side of these inflection points, the fringe pattern count increases from eight to ten and remains constant. Since this crinkled yarn has regularly alternating round and nonround sections (see FIGURES 5 and 6), the fringe pattern count varies depending upon the viewing angle. To illustrate further, the solid line portion of FIGURE 11, it will be assumed, represents a plan view of a given yarn sample. An elevation view (or a view 90° displaced from the first view) of this same yarn will produce a fringe pattern count complementing that of the first view, or as shown in dotted lines in FIGURE 11. In other words, starting from the same 0° point of a crimp cycle, the fringe pattern count decreases to six at the 45° displacements mentioned above rather than increases to ten. It is noted, however, that the change in fringe pattern count remains predictable and uniformly proportionate to or correlated with the curvature produced in yarn by the process of this invention.

British Patent No. 780,755 in the name of Imperial Chemical Industries Limited purports to draw freshly formed yarn from a spinneret and pass the same to a crimping device. The crimping device consists of a conventional set of gear crimping wheels which are rotated at a surface speed of about 12,000 feet per minute and which "bite" the yarn passing between intermeshing teeth so as to crimp filaments contained therein. Patentee extrudes these filaments from his spinneret at a speed of about 120 feet per minute after which they are attenuated at a ratio of about 100 to 1 during propulsion in the crimping zone. It is apparent that this device is operative only when integrated with spinning and, as a matter of fact, this is so indicated by patentee who states that his system cannot be operated at speeds of less than 10,000 feet per minute. From these and other statements made throughout the patent, it is believed that yarn passing into that crimping zone clearly remains in a somewhat plastic condition due to retention of extrusion heat and is merely further attenuated by cooperating gear wheels.

It is further apparent that the process of the British patent is directed to treatment of a large tow of filaments which after gear crimping is subsequently cut into staple, primarily because no winding device presently known or available in the art could accommodate the collection of filaments traveling at the aforesaid 12,000 feet per minute and produce a suitably shaped package or a twisted yarn. In this connection, it is noted that the British patent is completely silent with respect to collection equipment. While such a continuous system of extruding, attenuating, crimping, and cutting of filaments in one operation might have advantages in producing staple fiber, it is not adaptable for the commercial production of synthetic high polymer continuous filaments.

The present invention, on the contrary, is primarily concerned with crimping of unsoftened or solid yarn which has previously been attenuated the desired amount in a plastic condition and collected in package form on a tube or the like. "Attenuation" as used herein is intended to pertain to elongation of yarn in a plastic state, while the term "drawing" will connote the completed molecular orientation of yarn after the same has cooled to a nonplastic or solid condition.

After production, attentuation and intial collection, yarn generally is drawn at a ratio of about 3 or 4 to 1, usually while being twisted on a drawtwisting machine. It is contemplated that, for obvious production reasons, this drawing operation be combined with the present concept of simultaneous drawing and crimping. For example, incompletely oriented but fully attenuated yarn can be drawn at a ratio of 2.5 to 1 while being fed directly into a crimping zone, wherein crimping or lateral drawing at a ratio of about 1.5 to 1 is accomplished. In other words, undrawn yarn can be partially drawn immediately prior to crimping and can be physically deformed into a crimped condition while completing the drawing. Alternatively, however, and in a less preferred embodiment, partial drawing of fully attenuated but undrawn yarn can be accomplished with available drawtwisting equipment, and draw crimping to complete yarn elongation can occur in a separate stage.

With attention now directed to the drawings, further elucidation of the present invention will be given. In FIGURE 1, a package 10 of completely attenuated but undrawn yarn is mounted in any convenient manner adjacent a drawtwisting machine 11 of conventional but slightly modified construction. Undrawn yarn 12 is passed from the supply package through guide 13 into the bite of cooperating feed rollers 14 which are driven in any convenient manner at a given rate of speed.

Yarn 12 in the preferred embodiment is heated during the initial or partial drawing operation. Accordingly, a surface heater 15 has been inserted between feed rollers 14 and draw wheel 16 which for the sake of convenience will hereinafter be referred to as a pin wheel. After passage over draw wheel 16, to be fully described as a pin wheel hereinbelow, the yarn (which has now been crimped and therefore is identified as 12a) is passed through an additional guide 17 and taken up on a conventional twisting spindle generally indicated at 18. Spindle 18 may be driven by belt 20 as is known in this art.

Figure 2:
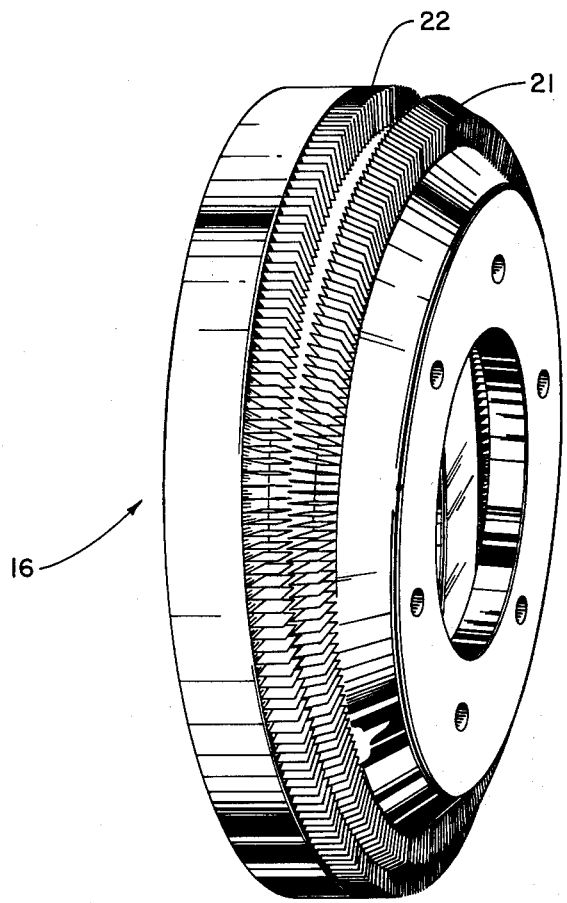
FIGURE 2 is an enlarged perspective view of the pin wheel showing the coaction of the two pin groups.

As indicated earlier, the drawtwister equipment described immediately hereinabove is conventional except for the substitution of a pin wheel 16 for the standard draw godet or roller. Pin wheel 16 comprises a pair of discs each supporting a plurality of pins which in reality are thin blades somewhat similar to, but considerably more numerous than, the pin wheel shown in Chemstrand Patent No. 2,974,392, mentioned earlier. (See FIGURE 2.) Use of the term "pin wheel" in the singular is herein intended to connote a pair of discs mounted on skewed axes, each disc supporting a plurality of circumferentially spaced pins, the pins on one disc being so disposed as to intermesh with pins on the other discs to provide a point of maximum separation and another point of maximum intermeshing displaced 180° from the first point. Although the extent of separation and intermeshing is exaggerated considerably therein, FIGURE 2b illustrates a layout of displacenet of these pins through one complete or 360° cycle of operations.

Wrapping of yarn 12 completely around pin wheel 16 provides sufficient frictional resistance or grip to permit use of this pin wheel 16 as a draw godet. Accordingly, rotation of the pin wheel 16 is provided by any known means at a sufficiently higher rate of speed than feed rollers 14 to enable yarn drawing at a ratio of about 2.5 to 1. Other partial drawing ratios obviously could be utilized, depending upon the end products desired and the particular yarn being processed. It will be apparent that the two sections or two pin supporting discs constituting wheel 16 should be geared together in any convenient manner for simultaneous rotation.

Figure 2A:
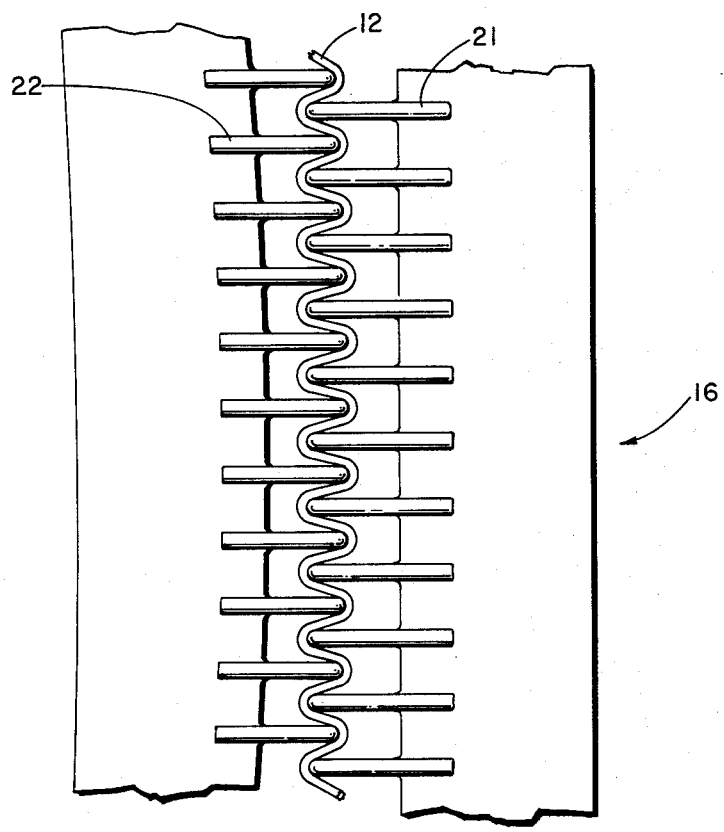
FIGURE 2a is a greatly enlarged section of the pin wheel showing the maximum engagement between the teeth and the yarn.

After passage through feed rollers 14 and after partial drawing on hotplate 15, if the same is utilized, yarn 12 is passed into pin wheel 16 (see FIGURE 2a) for the draw crimping procedure of this invention. As indicated earlier, the pin wheel layout of FIGURE 2b is purely schematic and does not represent the total of about 400 pins involved (see FIGURES 2 and 2a). In any event, however, yarn is passed into wheel 16 during the first 90° of rotation while pin group 21 on one disc is separated from pin group 22 on the other disc. During this first 90° of rotation and perhaps for 15 additional degrees, yarn 12 is gripped sufficiently to permit further relative movement between pin group 21 and pin group 22 without slippage of yarn thereover.

After grippage in this manner, further lateral movement of each pin relative to adjacent pins is provided. Accordingly, from a point approximating 100° or 105° rotation after the initial starting point to about 180° of rotation, lateral separation of pin group 21 from pin group 22 actually physically deforms or elongates yarn contained thereon. Yarn 12 in this particular zone therefore is physically drawn laterally into a crimped condition. While heater 15 has been shown adjacent pin wheel 16, it has been demonstrated that this heater contributes primarily to the partial longitudinal yarn elongation between feed rollers 14 and pin wheel 16 and is not essential to completion of or lateral drawing on the pin wheels.

From a point represented by 180° of wheel rotation to about 270° from the starting point, yarn 12a, which has now been drawn into a crimped condition, is systematically and progressively relaxed from engagement by the two pin groups 21 and 22. For the first few degrees of rotation past the midpoint, retrogression of the two pin groups results in relaxation of yarn 12a relative to these pins as shown by solid lines in FIGURE 2b. Movement of the pins has been, as it were, away from the yarn since the crimps produced therein are permanent deformations from a solid yarn state. Between the 180° and 270° phases, however, the grip on yarn 12a is relaxed sufficiently to permit take-up by ringtwister 18 of any slack caused during draw crimping. The dotted line portion of FIGURE 2b therefore indicates the position of yarn 12a would have retained were it not for tension imparted by the ringtwister take-up. It is noted, however, that this ringtwister take-up tension is not sufficient to overcome all of the frictional resistance and the yarn 12a conforms to the decreased spacing of converging pin groups 21, 22 only for a portion of travel in this zone. For the last quarter of wheel rotation, or from the 270° to the 360° points, yarn 12a is completely released and thereafter pin groups 21, 22 begin converging on successive portions of yarn 12 as at the zero degree point.

Although yarn 12a discharging from the pin wheel of FIGURE 2b is shown in a straight line, the permanent crimps therein have been temporarily removed only through tension imparted by ringtwister 18, and this yarn would conform to the wavy or serpentine shape illustrated by FIGURE 3 if the tension were relaxed. If desired, even more crimp may be subsequently produced in yarn 12a by application of heat either before or after this yarn has been knit into hosiery, tricot, or other fabric form. It is preferred, however, and this is believed to be a significant aspect of this invention, that the latent crimp in yarn 12 not be recovered or developed until after knitting into fabric. With this system, therefore, all of the advantages of "knit-set" yarn may ultimately be attained in hoisery or fabric form without the concomitant disadvantages inherent in knitting or weaving a curvilinear yarn.

It is believed that the present invention has utility in the treating of any orientable yarn whether monofilament or multifilament. As one example of operation, however, 20 denier nylon 6 monofilament was fed between feed rollers 14 and pin wheel 16 at a sufficient rate of speed to effect partial drawing over hotplate 15 at a ratio of about 2.88 to 1. The hotplate was maintained at a temperature of approximately 160° C., which is considerably below the softening point of about 210° C. for this particular type synthetic linear high polymer. The pin wheel 16 consisted of 200 wires in pin group 21 and a cooperating 200 wires in pin group 22. Each wire had a diameter of 0.02 inch and was disposed on the periphery of a disc having a pitch circle of 2.75 inches. The maximum overlap at the 180° point shown in FIGURE 2b was 0.02 inch which, as will be apparent, amounted only to the thickness of one wire rather than the extreme separation shown for purposes of clarity.

With the maximum overlap indicated, this monofilament was drawn laterally about 1.5 to 1 during passage around the pin wheel 16. The total draw ratio therefore amounted to 4.32 to 1, partial drawing being across the hot plate and completion of drawing being on the pin wheel. As indicated earlier, this drawing occurred in the solid yarn state and is distinguishable from the attenuation of yarn in a plastic state. Yarn was discharged from pin wheel 16 and fed to ringtwister 18 at approximately 1000 yards per minute. It is believed, however, that speed limitation is controlled or determined only by the take-up and not by the pin wheel. After development of crimp by application of heat, a FIGURE 3 type yarn resulted having a wave length of 0.04 inch and an amplitude of 0.009 inch.

Another example of operation is that of crimping polypropylene yarn which utilizes the same process as that utilized for the nylon yarn. In this case, a 15-denier polypropylene monofilament was processed in the same system except that the hot plate was maintained at a temperature of approximately 150° C. The draw ratio over the hotplate was 2.5 to 1. The draw ratio during passage around the pin wheel was 1.5 to 1 so that the total draw ratio amounted to 3.75, partial drawing being across the hot plate and completion of drawing being on the pin wheel. The polypropylene yarn was discharged from the pin wheel and fed to the ring twister at approximately 1600 feet per minute.

Drawing of yarn laterally of the axis thereof into a crimped shape evidently imparts a permanent molecular orientation corresponding to the desired end product. Synthetic linear high polymer yarn is generally considered to have a memory. As applied to the present invention, it is believed that the yarn remembers or attempts to conform to the last physical shape in which it was treated by mechanical reorientation of molecules; hence, the resulting permanency of crimp produced by this invention and the ease in restoration or development of crimp by the application of heat to relax molecules. It is further believed that any of the various synthetic linear high polymer yarns, such as polyesters, polyolefins, etc. possess the crimp potentiality herein described.

It should be noted, as mentioned above, that pin wheel 16 described herein conforms generally to known structure and for that reason no allegation to novelty in apparatus is made. It should be noted further, however, that this pin wheel is provided with sufficient yarn engaging elements to enable complete anchoring or gripping of yarn prior to maximum pin separation. Without such anchoring, it is obvious that yarn 12 merely would slip into a zig-zag configuration during pin separation without physical elongation and deformity. In such an operation, it will be apparent that a setting agent such as heat must be applied to the yarn while in displaced condition in order to retain the crimp produced. On the contrary, however, it is not essential to the present invention that heat be applied to pin wheel 16, and the use of hotplate 15 may be eliminated if desired. Furthermore, mere relaxation of tension in yarn treated according to this invention will restore or develop the latent crimping contained therein. While application of heat produces even more crimp, this also is not essential and should not be considered a critical feature.

While a twister type take-up has been shown in connection with the foregoing description, it will be apparent that a flat package winding apparatus also could be used. It is significant to note only that tension imparted during take-up is not detrimental to the ultimate product as in the case of crimp produced by heat setting. Furthermore, the equipment described herein may be easily modified to accommodate multifilament rather than monofilament yarn. While, as a matter of expediency, FIGURE 2 has been exaggerated to clarify operation of this invention, as explained earlier, in actual practice pin group 21 barely clears pin group 22 during interdigitation with yarn passing therearound. It will be apparent that the circumferential spacing between adjacent pins should be modified for processing yarn of greater diameter than the 20-denier monofilament shown. Moreover, pin diameter obviously controls the crimp shape and should be modified if a greater or lesser crimp is desired.

It has been found that the process described herein produces on a continuous basis and at a speed as high as 1000 yards or more per minute a yarn which has a residual shrinkage well above 8%. Since crimp resulting from the process described herein in somewhat patent, but primarily latent, an additional advantage of further processing with substantially normal or straight yarn is obtained. It is obvious that considerably less time and equipment is involved which results in a substantially economical operation. Moreover, since only the draw godet of a conventional drawtwisting machine need be replaced, it is apparent that a saving in initial investment will also be attained. While the equipment shown herein does not utilize a drawpin for localizing partial yarn elongation, it is obvious that the same (either cold, warm, or hot) may be utilized as desired.

The discussion herein has been somewhat confined to the feeding of completely undrawn yarn to feed rolls 14. Since the primary purpose of this invention is to provide a fast and economical practical system of producing crimped yarn, it is preferred that any additional procedure required be incorporated on existing equipment when possible. It is desired therefore not to increase the handling of yarn normally encountered in a commercial manufacturing plant. For this reason, the extent of drawing normally produced on a drawtwisting machine as described herein has been reduced to permit subsequent completion of drawing during the pin wheel crimping operation. If desired, however, initial drawing could be accomplished in one stage and on one machine and draw crimping could be produced in a separate operation on additional machinery. It should be pointed out in this connection, however, that yarn fed to pin wheel 16 must be capable of further elongation regardless of how initial drawing is accomplished. Combining of partial drawing and draw crimping into one continuous operation along with twisting, when desired, has been found to operate very effectively, however, and for obvious reasons is preferred over separate and independent drawing steps. Although, as indicated, this invention will not operate on completely drawn yarn, it is obvious that the same will perform satisfactorily either on completely undrawn or only partially drawn orientable yarn.

The expression "yarn" used throughout the specification and claims is intended to mean any strand type materials such as threads, filaments, fibers, and the like.

Inasmuch as other modifications will be apparent to those skilled in this art, it is intended that the present invention be limited only to the scope of the following claims.

What is claimed is:

1. A process for permanently crimping continuous filament yarn comprising the steps of feeding undrawn filamentary material formed from synthetic linear high polymers along a rectilinear path while heating the same below its softening point, partially drawing said filamentary material by extending the same longitudinally, passing said partially drawn filamentary material immediately into a crimping zone, anchoring said filamentary material to prevent slippage relative to, while permitting unimpeded passage through said crimping zone, completing the drawing of said filamentary material by forcing the same laterally of said rectilinear path into a crimped condition to complement orientation of molecules therein, and winding the drawn and crimped filamentary material into package form.

2. A process for permanently crimping a continuous filament yarn formed from synthetic linear high polymers comprising the steps of feeding undrawn filamentary material along a rectilinear path, heating the filamentary material below its softening point while passing the same along said rectilinear path, partially drawing said filamentary material by extending the heated portion along the rectilinear path, feeding said partially drawn filamentary material immediately into a crimping zone, anchoring said filamentary material in said crimping zone to prevent slippage relative thereto while permitting unimpeded passage therethrough, gripping successive portions of said filamentary material in said crimping zone at multiple-spaced points after the same has been anchored, forcing alternately gripped portions of said filamentary material in opposite directions laterally of said rectilinear path to physically extend and complement orientation of the molecules thereof into a crimped condition, maintaining the crimped condition of said filamentary material until it is sufficiently chilled to insure permanency of crimp, and winding said drawn and crimped filamentary material into package form.

3. A process for producing permanently crimped filaments formed from a synthetic linear high polymer, which comprises unwinding the filaments in an undrawn state from a previously wound package and propelling the same to a heating zone where the filaments are heated to a temperature substantially below the softening point and partially drawing the filaments during the heating treatment and then propelling the filaments to a combination drawing and crimping zone, wherein the filaments are simultaneously completely drawn and crimped by passing them through a tortuous path which increases in a lateral direction until about midway through the said path and to a point where the filaments are completely drawn, continuing the propulsion of the filaments through the tortuous path which decreases in a lateral direction to effect relaxation of the filaments solely from the decreasing lateral path whereby the filaments are in a relaxed, crimped condition until the crimps are inherently set therein, and finally, applying sufficient tension to the filaments to temporarily remove the crimps therefrom, and collecting the same in an orderly manner in compact package form.

4. A completely drawn thermoplastic synthetic linear high polymer yarn characterized by being crimp drawn in an unsoftened state and having a uniformly interrupted fringe pattern which corresponds in regularity to the yarn crimp, said yarn also having a high degree of residual shrinkage and contraction, both of which are developed by the application of heat.

5. A product as defined in claim 4 in which the residual shrinkage is greater than 8%.

6. A completely drawn thermoplastic synthetic linear high polymer yarn characterized by being crimp drawn in an unsoftened state and having a uniformly interrupted fringe pattern correlated to the yarn crimp in a whole number ratio, said yarn also having a high degree of residual shrinkage and contraction, both of which are developed by the application of heat, and a latent permanent crimp.

7. A completely drawn thermoplastic synthetic linear high polymer yarn characterized by being crimp drawn in an unsoftened state and having a uniformly interrupted fringe pattern, said yarn also having a high degree of residual shrinkage and contraction, both of which are developed by the application of heat, a latent permanent crimp, and cyclically recurring round and non-round cross sections occurring at a frequency correlated with the crimp.

8. The yarn of claim 4 being nylon.
9. The yarn of claim 4 being polypropylene.

References Cited by the Examiner
UNITED STATES PATENTS

| | | | |
|---|---|---|---|
| 2,623,266 | 12/1952 | Henni | 161—169 |
| 2,636,250 | 4/1953 | Henni | 28—72 |
| 2,669,001 | 2/1954 | Keen | 28—72 |
| 2,974,391 | 3/1961 | Speakman et al. | 28—72 |
| 2,974,392 | 3/1961 | Timbie | 28—72 |
| 3,019,509 | 2/1962 | Cox et al. | 161—173 |
| 3,177,556 | 4/1965 | Van Blerk | 28—72 |

ALEXANDER WYMAN, *Primary Examiner.*

DONALD W. PARKER, *Examiner.*

L. K. RIMDODT, R. A. FLORES, *Assistant Examiners.*